(12) United States Patent
Ramanujan et al.

(10) Patent No.: US 10,275,501 B2
(45) Date of Patent: Apr. 30, 2019

(54) SYSTEM AND METHOD FOR MULTI-DIMENSIONAL DATA REPRESENTATION OF OBJECTS

(71) Applicants: TATA Consultancy Services Limited, Mumbai (IN); Purdue Research Foundation, West Lafayette, IN (US)

(72) Inventors: Devarajan Ramanujan, West Lafayette, IN (US); William Z. Bernstein, West Lafayette, IN (US); Karthik Ramani, West Lafayette, IN (US); Devadatta Madhukar Kulkarni, Rochester Hills, MI (US); Jeffery Tew, Rochester, MI (US)

(73) Assignees: TATA Consultancy Services Limited, Mumbai (IN); Purdue Research Foundation, West Lafayette, IN (US)

( * ) Notice: Subject to any disclaimer, the term of this patent is extended or adjusted under 35 U.S.C. 154(b) by 600 days.

(21) Appl. No.: 14/813,686

(22) Filed: Jul. 30, 2015

(65) Prior Publication Data
US 2016/0034544 A1    Feb. 4, 2016

Related U.S. Application Data

(60) Provisional application No. 62/032,466, filed on Aug. 1, 2014.

(51) Int. Cl.
*G06F 17/30*    (2006.01)

(52) U.S. Cl.
CPC .. *G06F 17/30554* (2013.01); *G06F 17/30533* (2013.01)

(58) Field of Classification Search
CPC .............. G06F 17/30554; G06F 17/30533
See application file for complete search history.

(56) References Cited

U.S. PATENT DOCUMENTS

| | | | |
|---|---|---|---|
| 2007/0239683 A1* | 10/2007 | Gallagher | G06F 17/30265 |
| 2007/0288452 A1* | 12/2007 | Podilchuk | G06K 9/6215 |
| 2012/0030244 A1* | 2/2012 | John | G06F 17/3089 707/797 |
| 2015/0347801 A1* | 12/2015 | Svetal | G06K 7/1447 235/454 |

\* cited by examiner

*Primary Examiner* — Loc Tran
(74) *Attorney, Agent, or Firm* — Schwegman Lundberg & Woessner, P.A.

(57) ABSTRACT

Systems and method for multi-dimensional data representation of an object is provided. The multi-dimensional data representation method includes evaluating a similarity measure for a query corresponding to an object. The similarity measure between the objects are used to compute the similarity values corresponding to the object and based on at least one metadata dimension associated with the object. The similarity value are sorted to create a multi-dimensional array of similarity values. The similarity values are represented in a scalar form and a visualization interface displays a multi visual representation of the similarity values and data associated with the object.

20 Claims, 7 Drawing Sheets

| | Update object border color (501) | Update background color (501) | Update all objects & layouts (501) | Update label object (502) | Update all points and layout (503) | Update point color (503) | Update 3D object (505) |
|---|---|---|---|---|---|---|---|
| Change selected object (501) | X | | | X | | X | X |
| Change reference object (501) | X | X | | X | X | X | X |
| Change similarity dimensions (502) | | X | | | | | |
| Change similarity sliders (502) | | X | | | | | |
| Change selected point (503) | X | | | X | | X | X |
| Change query (504) | X | X | X | X | X | X | X |

SYSTEM AND METHOD FOR MULTI-DIMENSIONAL DATA REPRESENTATION OF OBJECTS

CROSS-REFERENCE TO RELATED APPLICATIONS AND PRIORITY

This application is related and claims the benefit of priority to U.S. Provisional Patent Application Ser. No. 62/032,466, filed on Aug. 1, 2014, the entirety of which is incorporated herein by reference.

TECHNICAL FIELD

The present subject matter relates, in general, to data representation, and, in particular, to systems and methods for multi-dimensional data representation of an object.

BACKGROUND

Human-centered data exploration is challenging task because of the issue of having to deal with multiple inter-related parameters. Cognitive load resulting from complex inter-relationships between parameters can hinder insight generation. Presenting parameters in a structured manner can help users to succeed. A structured multidimensional representations for such data helps to generate insights about the complex and dynamic relationships between parameters. Such exploratory tasks may also be aided by visualizations of these multidimensional representations so as to allow users to reason through heterogeneous, complex, and often incomplete datasets.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, embodiments herein provide a systems and methods for providing multi-dimensional data representation of an object. In one aspect, a computer-implemented system executed by a computing device for multi-dimensional data representation of an object is provided. The system includes at least one data repository containing a plurality of objects and corresponding object metadata and metadata dimensions. Further, the system includes at least one memory and at least one processor. The at least one memory and the at least one data repository coupled to the at least one processor is capable of executing programmed instructions stored in the at least one memory to receive a query corresponding to an object, defined on at least one device via a multi-modal querying interface; and to evaluate a similarity measure by comparing the defined query with the plurality of objects and the at least one metadata dimensions associated with the object to compute a similarity value and to create multidimensional array comprising a set of similarity values, the set of similarity values being indicative of extent of similarity between the defined query and the plurality of objects. Further, the system includes a visualization interface, coupled to the at least one processor, for generating at least one multi visual representation of the computed multi-dimensional array of similarity values and the object metadata as graphical data, the multi visual representation is mapped on to one or more visual variables.

The at least one processor is further configured by the instructions to pre-compute the similarity value by evaluating the similarity measures based on one or more previously defined query on the at least one device The at least one processor is further configured by the instructions to predefine the at least one metadata dimension for the object associated with the defined query.

The at least one processor is further configured by the instructions to filter the objects, filter the objects having a similarity value outside a predetermined similarity threshold range for each of the metadata dimensions, from amongst the plurality of objects based on the computed similarity value.

The at least one processor is further configured by the instructions to receive the query corresponding to the object defined on a plurality of devices. The at least one processor is further configured to allow interactions amongst the plurality of devices to generate a plurality of visual representations, and a plurality of data sets associated with the interactions. The plurality of data sets includes interactions amongst the plurality of devices, a plurality of visual representations and information stored in the data repository. The at least one processor is further configured to link the plurality of data sets to provide a coordinated multi visualization representation.

In another aspect, computer-implemented method executed by a computing device for multi-dimensional data representation of an object is provided. The method includes receiving, a query corresponding to an object, defined on at least one device via a multi-modal querying interface. Further, the method includes evaluating a similarity measure by comparing the defined query with the plurality of objects and the at least one metadata dimensions associated with the object to compute a similarity value and to create multidimensional array comprising a set of similarity values, the set of similarity values being indicative of extent of similarity between the defined query and the plurality of objects. Further, the method includes generating at least one multi visual representation of the computed multi-dimensional array of similarity values and the object metadata as graphical data, the multi visual representation is mapped on to one or more visual variables.

The method further includes generating at least one multi visual representation of the computed multi-dimensional array of similarity values and the object metadata as graphical data, the multi visual representation is mapped on to one or more visual variables.

The method further includes predefining the at least one metadata dimension for the object associated with the defined query.

The method further includes pre-computing the similarity measure by calculating the similarity measures based on one or more previous query to obtain the similarity value.

The method further includes filtering the objects having a similarity value outside a predetermined similarity threshold range for each of the metadata dimensions, from amongst the plurality of objects based on the computed similarity value The method further includes selecting a probable object for the defined query based on the computed similarity values, the probable object is from amongst the plurality of objects.

In yet another aspect, a non-transitory computer-readable medium having embodied thereon a computer program for executing a method for multi-dimensional data representation of an object is disclosed. The method includes receiving, a query corresponding to an object, defined on at least one device via a multi-modal querying interface. Further, the method includes evaluating a similarity measure by comparing the defined query with the plurality of objects and the at least one metadata dimensions associated with the object to compute a similarity value and to create multidimensional array comprising a set of similarity values, the set of similarity values being indicative of extent of similarity between the defined query and the plurality of objects. Further, the method includes generating at least one multi visual representation of the computed multi-dimensional array of similarity values and the object metadata as graphical data, the multi visual representation is mapped on to one or more visual variables.

It should be appreciated by those skilled in the art that any block diagram herein represent conceptual views of illustrative systems embodying the principles of the present subject matter. Similarly, it is appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION

Figure 1:
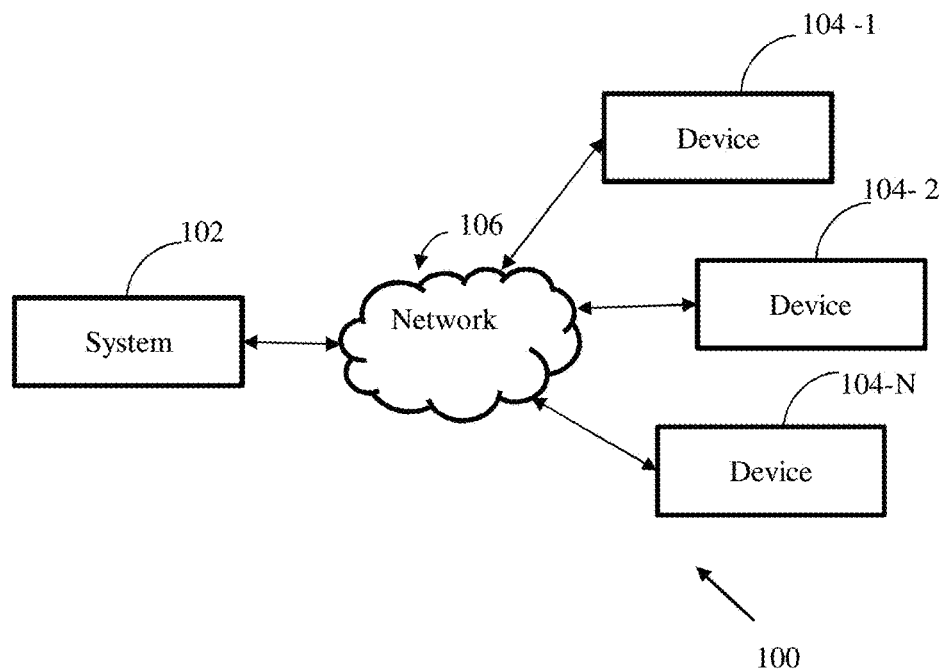
FIG. 1 illustrates a diagram of an example environment in which systems and/or methods, described herein, may be implemented, in accordance with example embodiments.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

FIG. 1 illustrates an exemplary diagram of an environment 100 implementing a multidimensional data representation system 102 for an object, in accordance with example embodiments. The multidimensional data representation system 102 may hereinafter be referred to as a system 102. The system 102 may be implemented in a variety of computing systems such as a laptop computer, a desktop computer, a notebook, a workstation, a mainframe computer, a server, a network server, and the like. It will be understood that the system 102 may be accessed through plurality of devices, for example electronic devices 104-1, 104-2, and 104-N, that may be collectively referred to as electronic devices 104. Examples of the electronic devices 104 may include, but are not limited to, a portable computer, a personal digital assistant, a handheld device, and a workstation. The electronic devices 104 are communicatively coupled to the system 102 through a network 106 for facilitating one or more users to access the system 102. In an embodiment, the electronic device 104-1 belongs to a user, and may facilitate a user in accessing information from the system 102. Likewise, the electronic devices 1041-N may belong to a plurality of users.

The system 102, for example is a system architecture with server-side management to store and maintain user interactions on the electronic devices 104, and exploration activities from a plurality of users connected via a network 106. The electronic devices 104 are configured to capture information such as user interaction with the system 102, with other users and results of these interactions is used to update the multidimensional data representation of the object. Further, the system 102, is descripted in detailed with respect to FIG. 2.

In one implementation, the network 106 may be a wireless network, a wired network or a combination thereof. The network 106 can be implemented as one of the different types of networks, such as intranet, local area network (LAN), wide area network (WAN), the internet, and the like, or any combination thereof used for transferring information between the electronic devices 104 and system 102. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
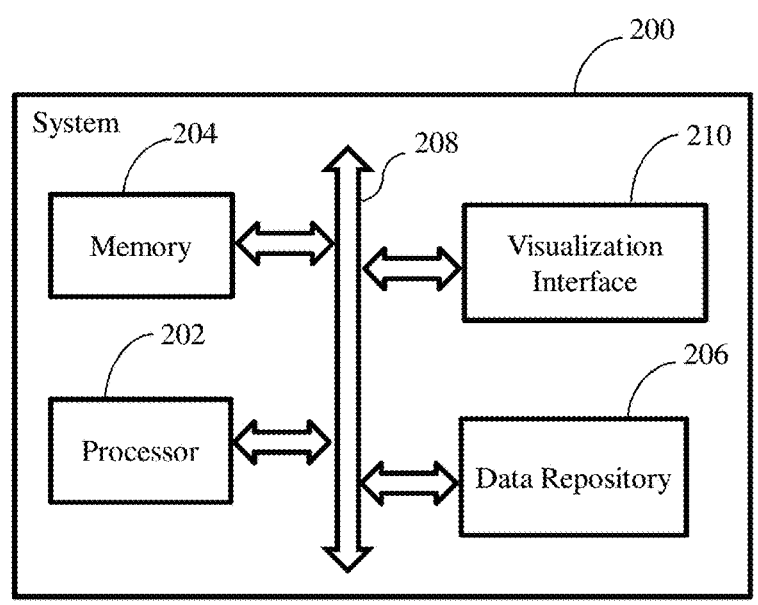
FIG. 2 is a block diagram of the system of FIG. 1, in accordance with an example embodiment.

FIG. 2 is a block diagram of a system, for example, the system 102 of FIG. 1, in accordance with an example embodiment. The system 200 includes or is otherwise in communication with at least one processor such as a processor 202, at least one memory such as a memory 204, at least one data repository such as a data repository 206 and a visualization interface 210. The processor 202, the memory 204, the data repository 206 and the visualization interface 210 may be coupled by a system bus such as a system bus 208 or a similar mechanism. Although FIG. 2 shows example components of system 102, in other implementations, system 102 may contain fewer components, additional components, different components, or differently arranged components than depicted in FIG. 2.

The at least one processor such as the processor 202 may be implemented as one or more microprocessors, microcomputers, microcontrollers, digital signal processors, central processing units, state machines, logic circuitries, and/or any devices that facilitates in managing access to a financial account. Further, the processor 202 may comprise a multi-core architecture. Among other capabilities, the processor 202 is configured to fetch and execute computer-readable instructions or modules stored in the memory 204. The processor 202 may include circuitry implementing, among others, audio and logic functions associated with the communication. For example, the processor 202 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 202 thus may also include the functionality to encode messages and/or data or information. The processor 202 may include, among other things, a clock, an arithmetic logic unit (ALU) and logic gates configured to support operation of the processor 202. Further, the processor 202 may include functionality to execute one or more software programs, which may be stored in the memory 204 or otherwise accessible to the processor 202.

The memory 204, may store any number of pieces of information, and data, used by the system 102 to implement the functions of the system 102. The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Examples of volatile memory may include, but are not limited to volatile random access memory (RAM). The non-volatile memory may additionally or alternatively comprise an electrically erasable programmable read only memory (EEPROM), flash memory, hard drive, or the like. The memory 204 may be configured to store information, data, applications, instructions or the like for enabling the system 200 to carry out various functions in accordance with various example embodiments. Additionally or alternatively, the memory 204 may be configured to store instructions which when executed by the processor 202 causes the system 200 to behave in a manner as described in various embodiments.

The visualization interface 210 may include an input interface and an output interface. The output interface may include an output device such as a display, a ringer, an earphone or speaker, a microphone, and an input interface. The input interface is configured to receive an indication of a user input. Examples of the input interface may include, but are not limited to, a keyboard, a mouse, a joystick, a keypad, a touch screen, soft keys, and the like. The output interface provides a visual, mechanical, audible or other output and/or feedback to the user. The visualization interface 210 may be in communication with the processor 202. In this regard, for example, the processor 202 may comprise user interface circuitry configured to control at least some functions of one or more elements of the visualization interface 210. The processor 202 and/or user interface circuitry comprising the processor 202 may be configured to control one or more functions of one or more elements of the visualization interface 210 through computer program instructions, for example, software and/or firmware, stored on a memory, for example, the memory 204, and/or the like, accessible to the processor 202.

In an example embodiment, the processor 202 along with the memory 204 and other components of the system 102 may be configured to receive a query from an electronic device 104 (FIG. 1) at the system 102. The querying on the electronic devices 104 is supported by a querying interface, for example a multi-modal querying interface. The querying may be performed by using at least one of or combination of text, sketches and images from one/more users. Alternatively or additionally, in some scenarios, receiving the query may include retrieving the stored one or more previous queries from the system 102. For example, the processor 202 may retrieve a text from the memory and/or data repository 206 of the system 102. One or more functionalities of the system 200 and components thereof, is further explained in detail with respect to FIGS. 3A and 3B.

In one embodiment, the at least one data repository 206 may be a design repository containing a 3-dimensional (3D) model of the object, for example, the 3D model is represented by a polygon mesh. Herein, the object may be a component, or a sub-assembly of components, or an assembly of components. Further, the data repository 206 consists of object metadata which includes information like material, manufacturing and function descriptions for each object and may be stored in the form of a standard ontology. Further, the data repository 206 may contain additional metadata dimensions. For example, the metadata dimension may include but not limited to color, shape, size, material, process, function and manufacture of the object. The metadata dimensions may be identified by an object name or an identifier (ID). The metadata may be three-dimensional representation such as polygon mesh, tree-based representation and the like. The information included in the data repository are part geometry of an object in the form of a 3D model, material definition, manufacturing definition, function description, identifiers for indexing and query and the like.

In an example embodiment, the visualization interface 210 is configured to display multidimensional data of the object. Further, visualization interface 210 is further configured to store the generated multi visualization representation in the form of linked data sets. In some embodiment, the linked data sets may be integrated for creating a shared display amongst the plurality of users. For example, allowing a first user to search the design repository, independently of a second user, from amongst the plurality of users. The first user is alerted of a search of the second user and updates visual representation based on a modification by the second user by accepting and/or rejecting the modification by the first user.

Figure 3A:
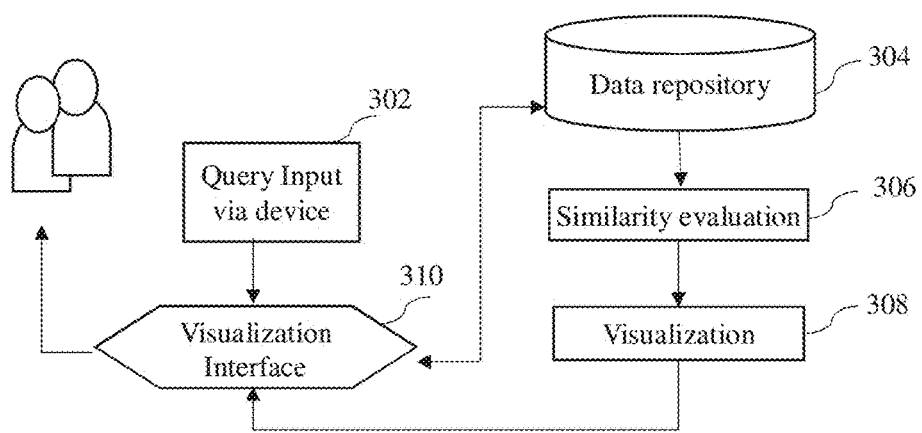
FIG. 3A is a flow diagram 300A illustrating working of system of FIG. 2, respectively, in accordance with an example embodiment
Figure 3B:
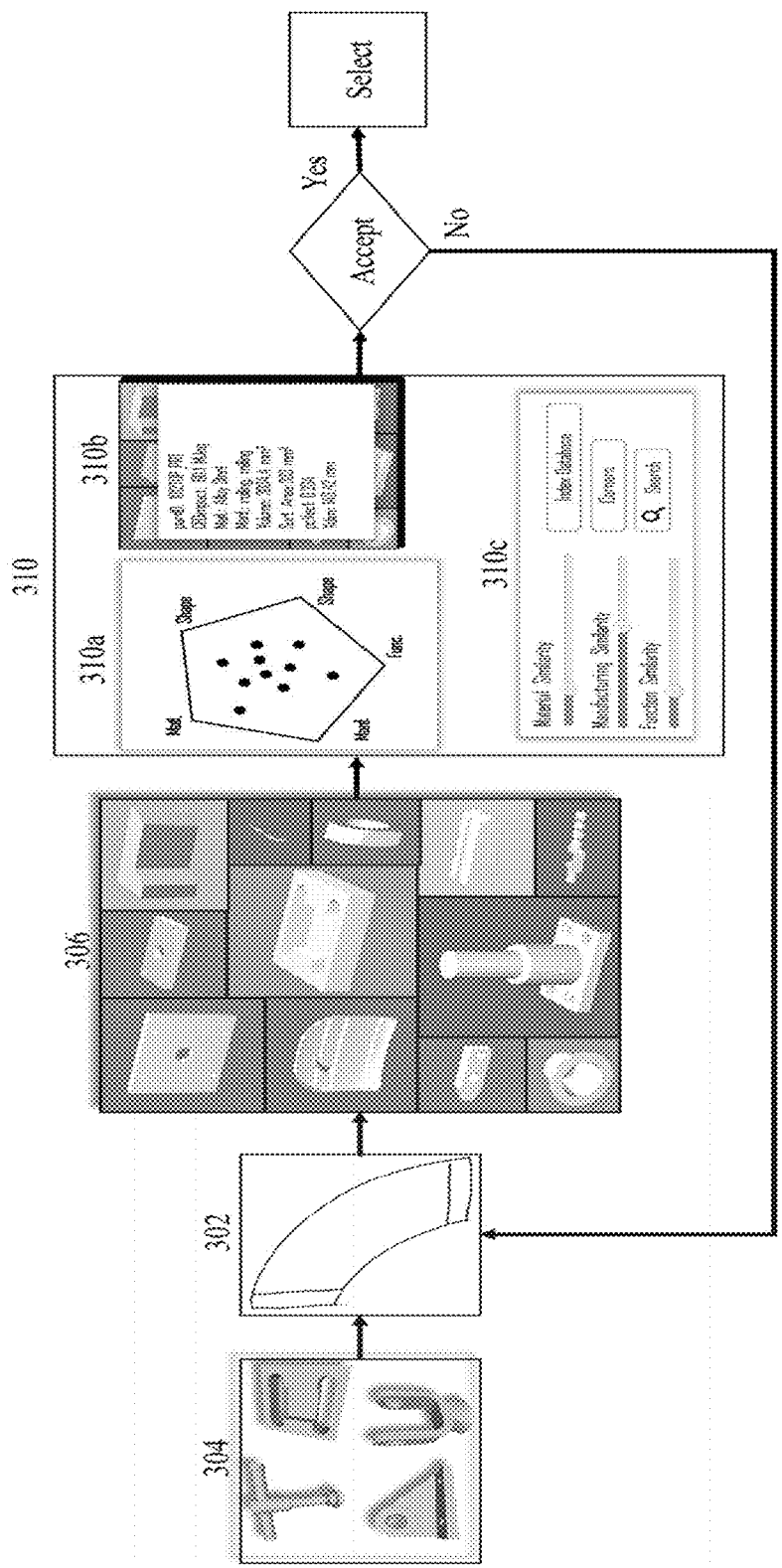
FIG. 3B is a graphical representation 300B illustrating working of system of FIG. 2, respectively, in accordance with an example embodiment.

FIGS. 3A and 3B are flow diagram 300A and graphical representation 300B, respectively illustrating functional flow in the system 200 of FIG. 2 for multi-dimensional data representation of an object, in accordance with an example embodiment. Herein, different functional blocks of FIG. 3A and corresponding graphical representations of the functional blocks in 3B will be referred by same numerals to describe the functional flow in the system 200, for the sake of brevity of description and clarity of explanation of the embodiments. Referring collectively to FIGS. 3A and 3B now, in an example embodiment, a query is defined on a device at 302, for example on at least one electronic device 104 (FIG. 1). In an example embodiment, defining the query 302 is performed by sketching at a user interface of the device. As shown in FIG. 3B, a sketch layout 302 implements a canvas for creating a two-dimensional sketch query. In another implementation, the query is defined on the electronic devices 104 by a user by uploading an image onto the sketch canvas. Further, the uploaded image on the device is converted into a sketch-like representation using a neighborhood-based high-pass filter that performs an edge detection. In some embodiments, the electronic devices 104 may also receive the query using textual data to search using the text-query box. Further, a combination of sketch, image, and textual queries may be used for querying.

For the defined query 302, for example a sketch based query, similarity measure is evaluated by comparing the defined query with the plurality of objects stored in the data repository 304 and at least one metadata dimensions as an input provided along with the query. Herein, at least one metadata dimensions may be set as a predefined similarity threshold range based on user preferences. The user defined similarity metrics along with the query is used for evaluating the similarity measure. In another embodiment, the at least one metadata dimension may be extracted from the stored metadata dimensions in the data repository 304. In some embodiment, the metadata dimensions may be extracted based on one or more previously defined queries. Further, similarities between the defined query corresponding to an object is evaluated by comparing defined query with the plurality of objects based on the at least one metadata dimensions to obtain a set of similarity values. Further, the set of similarity values is sorted and a multidimensional array of the similarity values is created. The set of similarity values indicate the extent of similarity between the defined query and the plurality of objects. The similarity evaluation is further described in detail.

As shown in FIG. 3B, at layout 306, a set of similar objects is retrieved and displayed based on the similarity values. For example, 'N' matches may be retrieved for the object associated with the defined query from the plurality of objects stored in the data repository 304, wherein N is any numerical value equal to or greater than one.

In one implementation, for the text-query box querying, objects are indexed by labeling with corresponding object name. For example, all the objects labeled as 'gears', from amongst plurality of objects that are shaped like the input sketch (query) will be displayed in the layout. The similar object labels are retrieved label matches and the similarity values are displayed. Further, from the set of N similar objects displayed, similar object(s) is selected based on the similarity values displayed 310 of FIG. 3B. In some embodiments, if the similar objects are not matched with respect to a predefined similarity threshold range, the process is repeated by modifying the query and setting the at least one metadata dimension as shown in FIG. 3B. The similarly values and change in a threshold range is further described in detail with respect to FIGS. 4A and 4B. In another embodiment, the objects in the layout falling outside the predefined similarity threshold range is filtered by deselecting from the layout. The similarity between the defined query and the plurality of objects (similarity evaluation) is further described as follows.

In an example embodiment, quantifying similarity between objects, from a plurality of object is performed by evaluating a measure of similarity or a distance between at least two objects. The similarity between two objects is a function of the commonality and the differences the two objects share with respect the at least one object metadata and associated metadata dimension. Further, the similarity of the metadata dimensions associated with the objects are captured using a distance function d: $\varepsilon \times \varepsilon \rightarrow R$ that operates on elements of a taxonomy '$\varepsilon$' and returns a real valued ($\in R$) distance measure, that is in in real numbers 'R'. Herein, the objects are classified as per a taxonomy based approach specific for each of the metadata dimensions.

In one embodiment, the metadata dimension may be material, function, shape and manufacturing of the object, having a material $m \in M$, a function $f \in F$ and a shape $s \in S$ and manufacturing $r \in R$. Here, R, M, F, S are the respective taxonomies adopted to represent these dimensions and are considered to be elements of a set $\rho$. A manufacturing process $r \in R$ is treated as an operator r: $\rho \times \rho \rightarrow P$ such that it operates on a particular object and returns another object with either same or different material and shape properties. Thus the entire sequence of manufacturing processing may be viewed as a composition of operators that transform an initial blank P0{m0, s0, f0} to the final part Pn={mn, sn, fn}.

In an example embodiment, the similarity between the query object and the plurality of objects is interpreted based the metadata dimensions namely material, function, manufacture, and shape, and a set of distance functions is defined for each of the metadata dimensions, namely, dm, df, dr, and ds associated with respectively. The material, manufacturing, shape and function definitions are represented using corresponding taxonomies, a generalized similarity measure may be adapted to the associated taxonomies.

Further, some embodiments may include at least one of algorithms, executable processes, and modules for similarity measure of objects based on a tree-based representation of object metadata. The mentioned similarity measure is applicable for categorical object metadata structured as a tree. The similarity measure generally converts information pertaining to the structure of the tree into a combination of similarity measures for design metadata which may be used to represent the similarity between at least two objects in the data repository.

Further, the computed similarity values are created into a multidimensional array of the similarity values. The multidimensional array of similarity values is a vector of similarity value composed from the dimensions of metadata specified for the collection of objects in the repository. In one embodiment, the array consists of [1-dm,1-df,1-dr,1-ds] where dm, df, dr, and ds represent pairwise similarities between an object and a reference object with respect to material, function, manufacturing, and shape.

In an example embodiment, evaluation of shape similarity using the (Bag of Features) BoF method is disclosed. The shape similarity evaluation includes following steps:

Feature Detection: In this step, a location of interest feature is detected for a given object by computing the "feature points" on the image using the Harris Detector. Detecting said location helps in identifying differences between shapes of at least two objects. The 'interest feature' are determined based on one or more characteristics for a particular object.

Feature Description: In this step, a patch descriptors for each detected feature is computed using the Scale Invariant Feature Transform (SIFT). SIFT embeds detected features in a high dimensional space by assigning a dimensional descriptor to each feature. For example, a 128 dimensional descriptors is used. Further, each feature is quantized using visual vocabulary. The feature descriptors computed using SIFT have high dimensionality and the complexity of computation increases with the number of features that are detected. To reduce some of the involved complexity, the visual vocabulary are computed by clustering features in the database, for example, the data repository.

Image Descriptor Generation: In this step, the image data is transformed into a histogram representing a count of occurrences of cluster center matches. Given any two histograms x and y that represent two images Sx and Sy respectively, a p-norm distance can be computed by the following equation:

$$d_{s(x,y)} = \left( \sum_{i=1}^{n} |x_i - y_i| \right)^{1/p}$$

In an example embodiment, a simple $L^1$ norm is used by setting p=1. Additionally, for quick retrieval of similar objects, a fast approximate nearest neighbor method is used to index the queries associated with an object. Thus, the overall distance between two parts is given by a set {dm, d, df; ds}. The set comprises pairwise distances of two objects corresponding their attributes.

The interpretation of similarities in material, function, or any such attribute is largely decided by the context of the application and therefore by the user. Hence, a multi-dimensional array of the similarity values are created, whereby, the user explores the data repository for the similar objects. Further, it also includes overlaying computed similarity information on environmental sustainability value.

The shape descriptor for the query is determined using the BoF method. The descriptor is matched to other pre-indexed descriptors for objects in the data repository and the best 'N' matches are chosen. The selected objects, referred here as reference object are displayed in the squarified layout view for further interaction. A probable object is selected from amongst the plurality of reference objects. The probable object is based on the requirement of the query defined by the user and on the predefined threshold similarity range.

Further, based on the similarity values between at least two objects, wherein one of the object is corresponding to the defined query and other object is from amongst the plurality of objects stored in data repository 304, a neighborhood object is determined. The neighborhood object provides any incomplete or missing information about the queried object metadata based on at least one metadata of neighborhood object, wherein the neighborhood is computed using the aforementioned similarity values.

As shown in FIG. 3A, the resulted similarity values are stored in a unit 308, for example, a visualization engine/software, in communication with the visualization interface 310. The visualization engine captures the query defined on the device, interaction amongst the plurality of devices and the information stored in the data repository 304, and displayed via a visualization interface 310. The visualization interface 310 generates multi visual representation (as depicted in 310 of 300B) of the computed multi-dimensional array of similarity values and the object metadata. The visual representations is in the form graphical data including and not limited to a tree-map layout, a bary-centric map and/or a bar graph. Further, the multi visual representation, which is in for example, graphical data, are mapped on to one or more visual variables. In an example embodiment, the visual variables are mapped on to appropriate graphical data using Jacques Bertin's seven basic visual variables: position, size, shape, value, color, orientation, and texture.

Furthermore, as shown in FIG. 3B, the resulted similarity values are further explored using the visualization interface 310, for example, the query is further explored by using a similarity polygon (a) a containing the similarity values, a slider for setting a similarity threshold value (b) and an interactive tooltip (c).

Referring to FIG. 3A, the visualization interface 310 is further configured to allow interactions amongst the plurality of devices to generate a plurality of visual representations, and a plurality of data sets associated with the interactions and to link the plurality of data sets to provide a coordinated multi visualization representation. Further, the interaction between the plurality of data sets is described in detail with reference to FIGS. 5A and 5B.

Figure 4A:
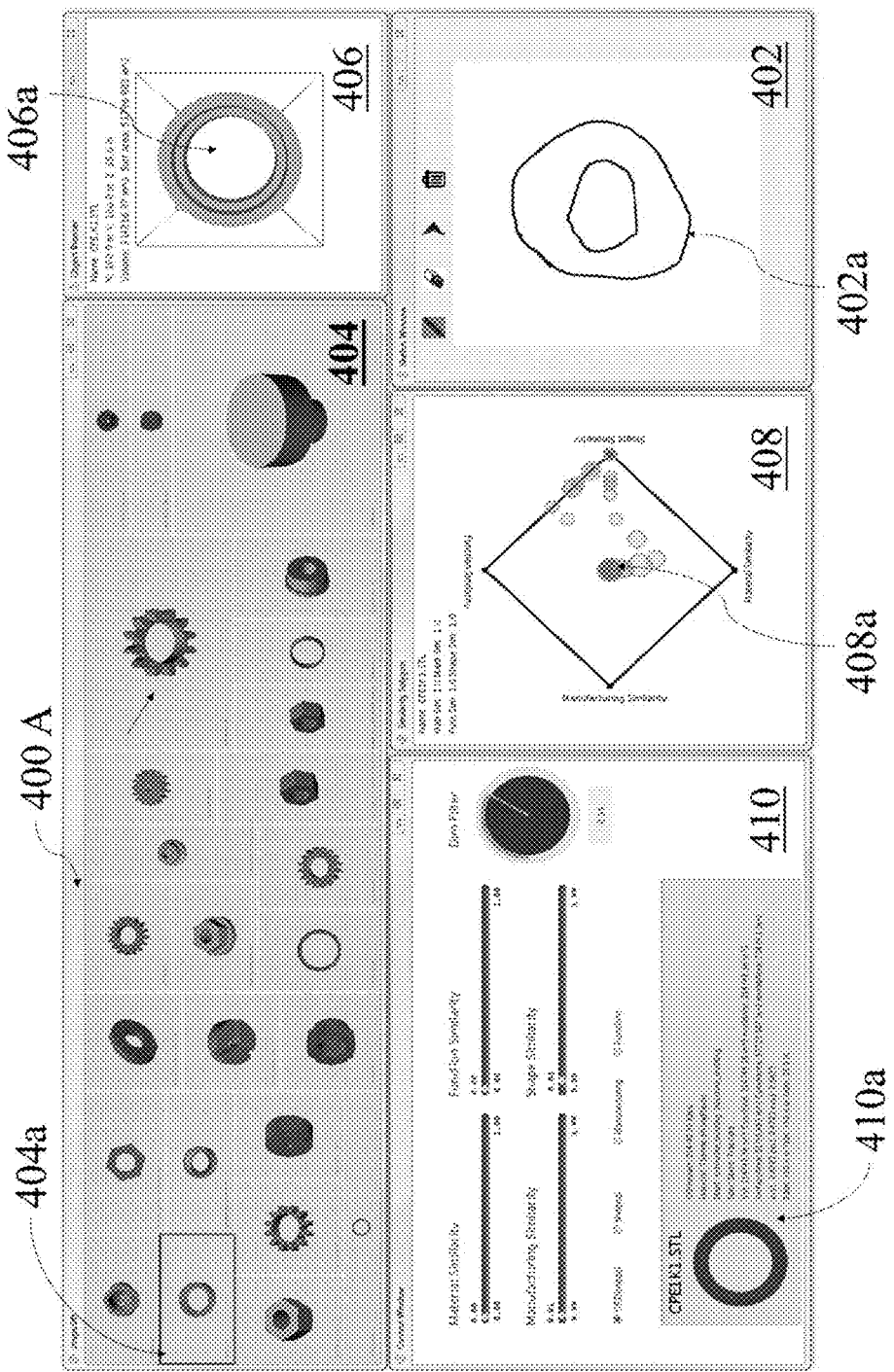
FIG. 4A is graphical representation 400A illustrating coordination across various layouts for defined threshold range, in accordance with an example embodiment.
Figure 4B:
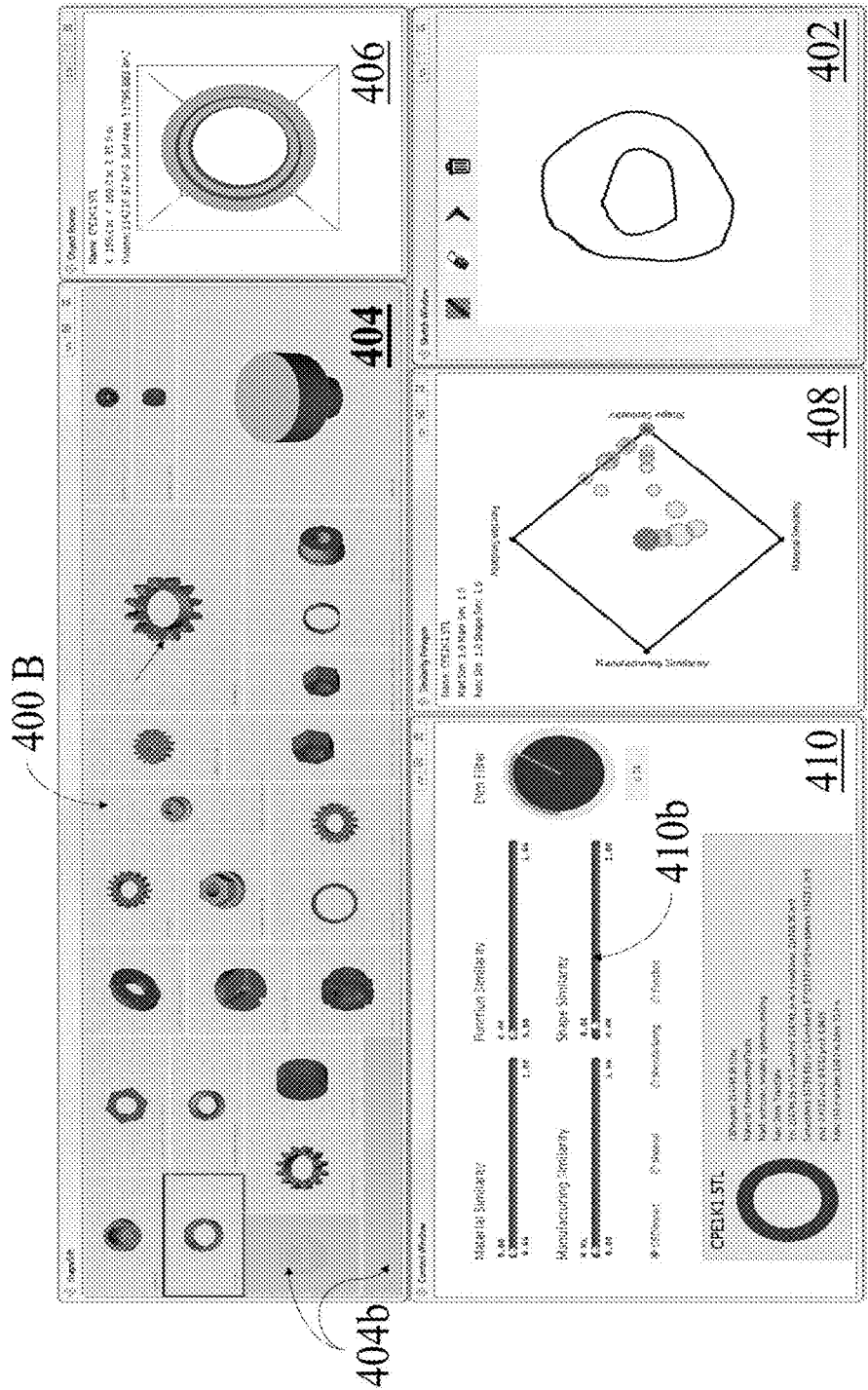
FIG. 4B is a graphical representation 400B illustrating coordination across various layouts for change in threshold range, in accordance with an example embodiment.

FIGS. 4A and 4B are graphic representation 400A and 400B illustrating coordination across various windows for computing the similarity values for a pre-defined threshold and change for a change in threshold, respectively, according to an embodiment of the present disclosure. In FIG. 4A, the representation 400A shows various layouts (402, 404, 406, 408 and 410) representing computation of the similarity value in the scalar form of the object. A query is defined in layout 402 (as shown at 402a), based on which the similar/matching objects are retrieved and displayed in the squarified layout 404. As soon as a user selects an object (as shown at 404a), namely a probable object, from amongst plurality of reference objects in the layout 404, corresponding 3D viewer is updated at 3D viewer layout 406 (as shown at 406a). The reference objects are retrieved from the repository for the particular defined query based on the computed similarity values. The object is highlight in the barycentric map of similarity values in layout 408 (as shown at 408a) and metadata label is displayed in a control window 410 (as shown at 401a). Similarly, changing the reference object in the squarified layout 404 updates the 3D viewer layout 406, re-computes the barycentric map of similarity values, and displays a metadata label for the reference object with respect to the defined query.

Referring to FIG. 4B, a change in the similarity threshold range in the control window 410 (as shown at 410b), the background color information in the squarified view is changed, such that the reference object above the threshold are grayed out (as shown at 404b). Further, the change and effect of these layouts are described in detail in FIGS. 5A and 5B.

In one embodiment the various layouts may be displayed on the electronic devices 104 (FIG. 1). In another embodiment the various layouts may be displayed on a single display screen at the system 102 (FIG. 1).

Figures 5A, 5B:
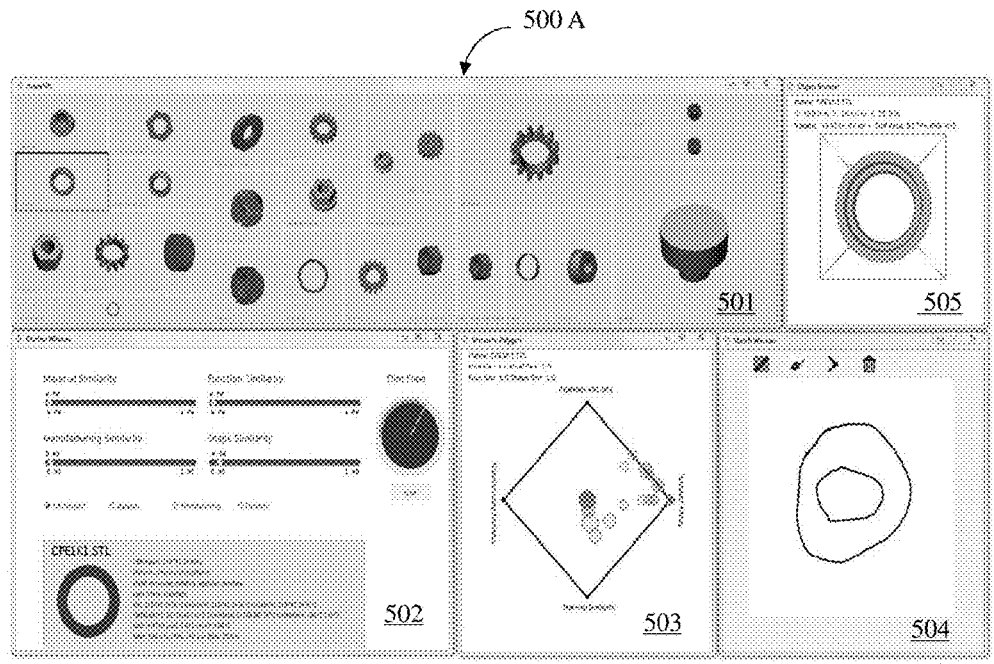
FIG. 5A is graphical representation 500A illustrating interaction and effects table showing coordination across various layout, in accordance with an example embodiment.
FIG. 5B is a table 500B illustrating interaction and effects table showing coordination across various layout, in accordance with an example embodiment.

FIGS. 5A and 5B are graphical representation 500A and table 500B illustrating coordination across various layout of the display with respect to the change and effect in the layout, in accordance with an example embodiment. As shown in FIG. 5A, any changes/modification with respect to the defined query associated with the object, is depicted in the layouts 501, 502, 503, 504 and 505. The changes/modification may include but not limited to changes in selected object, represented in layout 501, changes in reference object represented in layout 501, changes in similarity dimensions, represented in layout 502, similarity sliders represented in layout 502, changes in selected point, represented in layout 503 and query represented in layout 504. Referring now to FIG. 5B, the corresponding effects is shown in table 500B (across the first row of the table). Herein, the corresponding effects are referred with respect to the changes/modification (across the first column of the table). Referring collectively to graphical representation 500A and table 500B, in an example embodiment, the change in object selection 501 will have effect on the object boarder, object label and object layout (marked 'x' in the able). Similarly, the change in the reference object 501 will have effect (by updating) on the object boarder, object background, object label, all the points, point color and 3D object and so on and so forth. Various embodiments are as shown in the FIG. 5B, particularly table 500B, depicting various combinations of the change and effect with respect to the object for which the query is defined, reference object and the computed similarity values.

Figure 6:
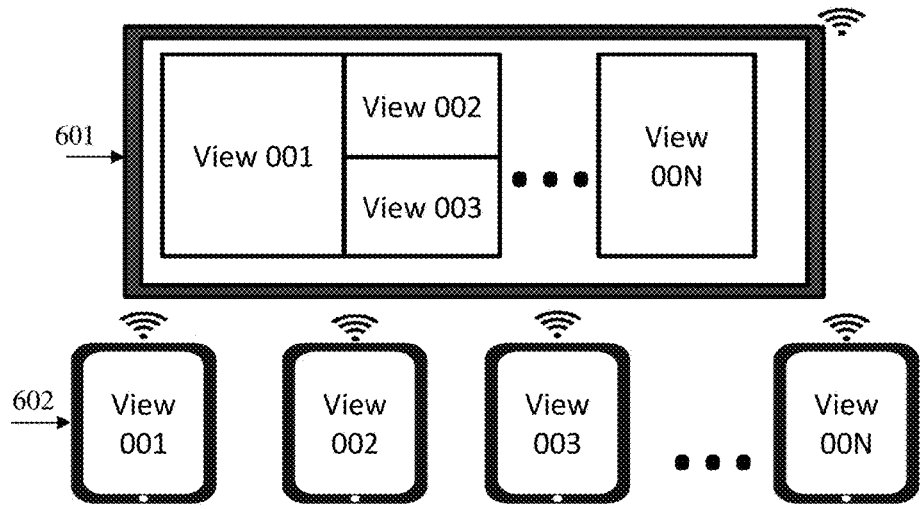
FIG. 6 illustrates collaboration across the plurality of devices, in accordance with an example embodiment.

Furthermore, FIG. 6 illustrates collaboration across the plurality of devices, in accordance with an example embodiment. In addition to the display as described with reference FIG. 2, in an example embodiment, the visualization (view) may be on a single display (as shown at 601) containing all the in individual displays or each display on the in visual user device (as shown at 602), the user may interact with each of the individual displays or the coordinated single display.

Further, the system is configured to estimate an environmental sustainability indicator of the objects based on the object metadata and an environmental impact database. When a query is defined for an object, a probable object is selected based on the similarity values, from amongst the plurality of reference objects. Further, the probable object is compared with one or more defined environmental impact characteristics to obtain the probable object which is compatible and sustainable with respect to the environmental impact. The environmental impact characteristics are based on volumetric data of the associated object. The volumetric data includes information related to volume, surface area, convex hull volume, and minimum bounding box volume and unit impact. Further, the sustainability indicator is applied in evaluating the performance metric of the object, for example, entire life cycle of the object.

Figure 7:
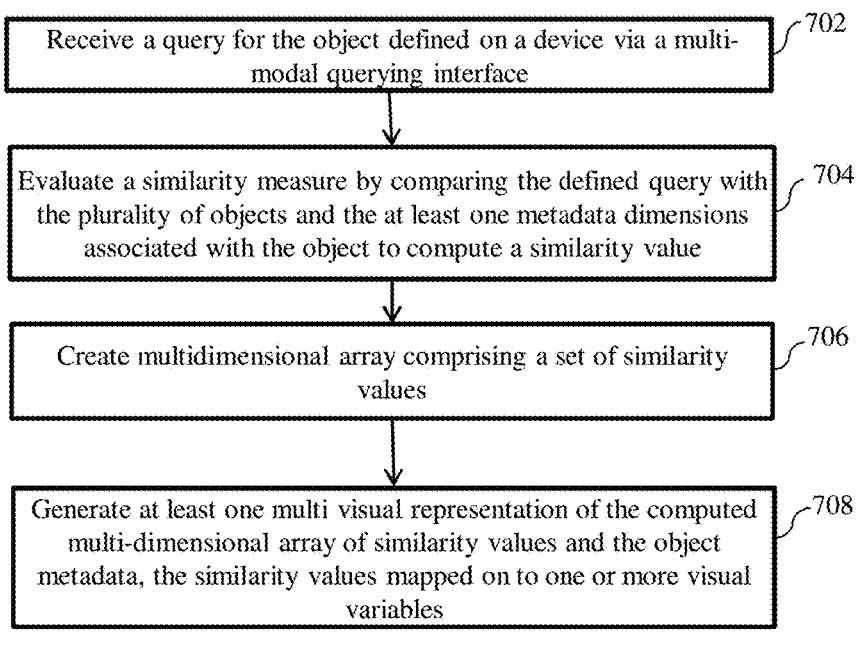
FIG. 7 illustrates a flow chart 700 for a multidimensional data representation of an object, in accordance with an example embodiment.

FIG. 7 illustrates a flow diagram of a method 700 for multi-dimensional data representation of an object, in accordance with the present disclosure. At block 702, incoming query corresponding to an object, is defined on at least one device, for example an electronic device, is received via a multi-modal querying interface. In an example embodiment, the multi-modal querying interface includes sketch windows containing a canvas and related controls for creating/modifying the sketch, uploading an image, and querying the data repository 206 (as shown in FIG. 2). At block 704, a similarity measure is evaluated for a defined query by comparing the defined query with the plurality of objects and the at least one metadata dimensions associated with the object to compute a similarity value. Further, in some embodiments, a text query box is also provided to query metadata dimension. A control panel is used for setting a predefined similarity thresholds for metadata dimensions such as material, manufacturing, function, and shape similarities and combination thereof. In an example, the computed similarity values is in the form of a scalar value. In some embodiments, the similarity values may be pre computed based on one or more previously defined queries on the user devices and stored in the data repository. At block 706, a multi-dimensional array of the similarity values is created. The multidimensional array of similarity values is a vector of similarity values composed from the dimensions of metadata specified for the collection of objects in the repository. Furthermore, in some embodiments, a predetermined similarity threshold range for each of the metadata dimensions is predefined and objects having similarity value outside the range are filtered. The objects are filtered from amongst the plurality of objects based on the computed similarity value i.e., the objects having a similarity value outside a predetermined similarity threshold range for each of the metadata dimensions.

At block 708, multi visual representations of the computed multi-dimensional array of similarity values and the object metadata is displayed. Further, the multi visual representation data are mapped on to one or more visual variable. In an example embodiment, the multi-visual representation generated is in the form of graphical data. The generated multi-visual representation is mapped on to one or more visual variables. The variables are mapped using Jacques Bertin's seven basic visual variables: position, size, shape, value, color, orientation, and texture. The values of these visual variable updates the presentation of data (generated multi-visual representation). In some embodiments, the query corresponding to the object may be defined on a plurality of devices, The method further includes a step of allowing interactions amongst the plurality of devices to generate a plurality of visual representation and a plurality of data sets associated such interactions. The plurality of data sets includes interactions amongst the plurality of devices, a plurality of visual representations and information stored in the data repository. Further include linking the plurality of data sets to provide a coordinated multi visualization representation.

In some embodiments, the above described method is based on query defined on the electronic device by the user and in some other embodiments the method is based on the information such as one or more previously stored queries, user interaction/modification and metadata dimensions stored in the data repository.

The order in which the in which the method(s) are described is not intended to be construed as a limitation, and any number of the described method blocks can be combined in any order to implement the method 700, or an alternative method. Additionally, individual blocks may be deleted from the methods without departing from the spirit and scope of the subject matter described herein. Furthermore, the method 700 can be implemented in any suitable hardware, software, firmware, or combination thereof.

In an implementation, one or more of the method(s) described herein may be implemented at least in part as instructions embodied in a non-transitory computer-readable medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media.

In various embodiments of FIGS. 1-7, a method and system for mutual coordination representation of an object is disclosed. The mutual coordination herein refers to maintaining a link of plurality of user interaction with respect to each visualization output, on the plurality of devices, including the resultant multi visual representation as well as the stored information associated with the object in the data repository.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device.

The preceding description has been presented with reference to various embodiments. Persons having ordinary skill in the art and technology to which this application pertains appreciate that alterations and changes in the described structures and methods of operation can be practiced without meaningfully departing from the principle, spirit and scope.

What is claimed is:

1. A computer implemented system for a multidimensional data representation of an object, the system comprising:
   at least one data repository comprising a plurality of objects and corresponding object metadata and associated metadata dimensions;
   at least one memory;
   at least one processor, the at least one memory and the at least one data repository coupled to the at least one processor, wherein the at least one processor is capable of executing programmed instructions stored in the at least one memory to:
      receive a query corresponding to an object, defined on at least one device via a multi-modal querying interface; and
      evaluate a similarity measure by comparing the defined query with the plurality of objects and the at least one metadata dimensions associated with the object to compute a similarity value and create multidimensional array comprising a set of similarity values, the set of similarity values being indicative of extent of similarity between the defined query and the plurality of objects; and
   a visualization interface, coupled to the at least one processor, to generate at least one multi visual representation of the computed multi-dimensional array of similarity values and the object metadata as graphical data, and wherein the graphical data is mapped on to one or more visual variables such that the similarity values associated with the one or more visual variables update the generated at least one multi visual representation.

2. The system as claimed in claim 1, wherein the at least one processor is further configured by the instructions to pre-compute the similarity value by evaluating the similarity measures based on one or more previously defined query on the at least one device.

3. The system as claimed in claim 1, wherein the programmed instructions stored in the at least one memory to predefine the at least one metadata dimension for the object associated with the defined query.

4. The system as claimed in claim 1, wherein the at least one processor is further configured by the instructions to filter the objects having a similarity value outside a predetermined similarity threshold range for each of the metadata dimensions, from amongst the plurality of objects based on the computed similarity value.

5. The system as claimed in claim 1, wherein the at least one processor is further configured by the instructions to determine a neighborhood object based on the similarity values, wherein the neighborhood object provides missing information of the object.

6. The system as claimed in claim 1, wherein the at least one processor is further configured by the instructions to select a probable object for the defined query based on the computed similarity value, the probable object is from amongst the plurality of objects.

7. The system as claimed in claim 6, wherein the at least one processor is further configured by the instructions to estimate an environmental sustainability value for the probable object based on environmental impact comprising a volumetric data of the objects.

8. The system as claimed in claim 1, wherein the at least one processor is further configured by the instructions to receive the querying in form of at least one of a text, a sketch, an image and a slider based control.

9. The system as claimed in claim 1, wherein the object metadata associated with the object comprises a three-dimensional representation of the object, wherein the three-dimensional representation is at least one of a polygon mesh representation and a tree-based representation.

10. The system as claimed in claim 1, wherein the similarity value is in the form of a scalar value.

11. The system as claimed in claim 1, wherein the visual representations comprises at least one of a tree-map layout, a bary-centric map and a bar graph.

12. The system as claimed in claim 1, wherein the at least one processor is further configured by the instructions to receive the query, corresponding to the object, defined on a plurality of devices, wherein the at least one processor is further configured by the instructions to:
   allow interactions amongst the plurality of devices to generate a plurality of visual representations, and a plurality of data sets associated with the interactions; and
   link the plurality of data sets to provide a coordinated multi visualization representation.

13. A computer implemented method for multidimensional data representation of an object, the method comprising:
   receiving, a query corresponding to an object, defined on at least one device via a multi-modal querying interface;
   evaluating a similarity measure by comparing the defined query with the plurality of objects and the at least one metadata dimensions associated with the object to compute a similarity value and creating multidimensional array comprising a set of similarity values, the set of similarity values being indicative of extent of similarity between the defined query and the plurality of objects; and
   generating at least one multi visual representation of the computed multi-dimensional array of similarity values and the object metadata as graphical data, and wherein the graphical data is mapped on to one or more visual variables such that the similarity values associated with the one or more visual variables update the generated at least one multi visual representation.

14. The method as claimed in claim 13, the method further comprises pre-computing the similarity value by evaluating the similarity measures based on one or more previously defined query on the at least one device.

15. The method as claimed in claim 13, the method further comprises predefining the at least one metadata dimension for the object associated with the defined query.

16. The method as claimed in claim 13, the method further comprises filtering the objects having a similarity value outside a predetermined similarity threshold range for each of the metadata dimensions, from amongst the plurality of objects based on the computed similarity value.

17. The method as claimed in claim 13, the method further comprises selecting a probable object for the defined query based on the computed similarity values, the probable object is from amongst the plurality of objects.

18. The method as claimed in claim 17, the method further comprises estimating an environmental sustainability value for the probable object based on environmental impact comprising a volumetric data of the objects.

19. The method as claimed in claim 13, further comprises receiving the query, corresponding to the object, defined on a plurality of devices, wherein the method further comprising:
   allowing interactions amongst the plurality of devices to generate a plurality of visual representations, and a plurality of data sets associated with the interactions; and
   linking the plurality of data sets to provide a coordinated multi visualization representation.

20. A non-transitory computer-readable medium having embodied thereon a computer program for multidimensional data representation of an object that is executable by a processor to perform data processing activities, the data processing comprising:
   receiving, a query corresponding to an object, defined on at least one device via a multi-modal querying interface;
   evaluating a similarity measure by comparing the defined query with the plurality of objects and the at least one metadata dimensions associated with the object to compute a similarity value and creating multidimensional array comprising a set of similarity values, the set of similarity values being indicative of extent of similarity between the defined query and the plurality of objects; and
   generating at least one multi visual representation of the computed multi-dimensional array of similarity values and the object metadata as graphical data, and wherein the graphical data is mapped on to one or more visual variables such that the similarity values associated with the one or more visual variables update the generated at least one multi visual representation.

* * * * *